United States Patent
Feyzeau et al.

(10) Patent No.: US 9,205,915 B2
(45) Date of Patent: Dec. 8, 2015

(54) METHOD FOR THE GUIDANCE OF A ROTORCRAFT, WHICH METHOD LIMITS NOISE DISCOMFORT IN A PROCEDURE FOR THE APPROACH TO A LANDING POINT

(71) Applicant: AIRBUS HELICOPTERS, Marignane (FR)

(72) Inventors: Pierre Feyzeau, Velaux (FR); Etienne Poudrai, Marseilles (FR)

(73) Assignee: Airbus Helicopters, Marignane (FR)

( * ) Notice: Subject to any disclaimer, the term of this patent is extended or adjusted under 35 U.S.C. 154(b) by 78 days.

(21) Appl. No.: 14/196,102

(22) Filed: Mar. 4, 2014

(65) Prior Publication Data

US 2014/0246541 A1 Sep. 4, 2014

(30) Foreign Application Priority Data

Mar. 4, 2013 (FR) .................................. 13 00472

(51) Int. Cl.
*G05D 1/00* (2006.01)
*B64C 19/00* (2006.01)
*G05D 1/06* (2006.01)

(52) U.S. Cl.
CPC .............. *B64C 19/00* (2013.01); *G05D 1/0676* (2013.01)

(58) Field of Classification Search
None
See application file for complete search history.

(56) References Cited

U.S. PATENT DOCUMENTS

| 3,758,765 | A | * | 9/1973 | Vietor | 701/18 |
| 3,868,497 | A | * | 2/1975 | Vietor | 701/121 |
| 3,875,379 | A | * | 4/1975 | Vietor | 701/121 |
| 3,911,436 | A | * | 10/1975 | Schanzer et al. | 342/411 |
| 4,063,218 | A | * | 12/1977 | Basov et al. | 340/951 |
| 6,186,447 | B1 | * | 2/2001 | Virdee | 244/188 |

(Continued)

FOREIGN PATENT DOCUMENTS

| EP | 0945841 | 9/1999 |
| JP | 2736045 | 4/1998 |
| WO | 2005100153 | 10/2005 |

OTHER PUBLICATIONS

French Search Report for FR 1300472, Completed by the French Patent Office on Feb. 5, 2014, 8 Pages.

*Primary Examiner* — Medhat Badawi
(74) *Attorney, Agent, or Firm* — Brooks Kushman P.C.

(57) ABSTRACT

A method for the guidance of a rotorcraft (1) in relation to a landing point (Pp) in accordance with a landing procedure. An approach route (R) is identified and an approach trajectory (T) is calculated in accordance with a ground slope (S) imposed by the approach route (R). An upstream segment (Sam) of the approach trajectory (T) is calculated through the application of a typical trajectory, as defined in accordance with the ground slope (S), the current mass of the rotorcraft (1), and a low-noise or noise-abatement criterion relating to the noise discomfort generated by the rotorcraft (1), taking into consideration a wind model (V) that represents the change in the wind between a current position of the rotorcraft (1) and the landing point (Pp). The position of the rotorcraft (1) is adjusted in proximity to the landing point (Pp) along the length of a transitional segment (St) of the approach trajectory (T), excluding, from the extension of the transitional segment (St), an application of the typical trajectory, and taking into consideration the ability of the rotorcraft (1) to perform a rapid maneuver toward a downstream segment (Sav) of the approach trajectory (T), as predefined in accordance with the ability of the rotorcraft (1) to reach the landing point (Pp) during stable flight.

21 Claims, 3 Drawing Sheets

(56) References Cited

U.S. PATENT DOCUMENTS

| | | | |
|---|---|---|---|
| 6,198,991 B1* | 3/2001 | Yamakawa et al. | 701/16 |
| 6,450,456 B1* | 9/2002 | Greene | 244/186 |
| 7,496,433 B1 | 2/2009 | Marze | |
| 7,611,098 B2* | 11/2009 | Van Boven | 244/183 |
| 7,647,140 B2* | 1/2010 | Demortier et al. | 701/16 |
| 8,027,758 B2* | 9/2011 | Ferro et al. | 701/18 |
| 8,180,506 B2* | 5/2012 | Sacle et al. | 701/16 |
| 2006/0111818 A1 | 5/2006 | Ishii et al. | |
| 2009/0043431 A1 | 2/2009 | Marze | |
| 2012/0133529 A1* | 5/2012 | He | 340/977 |
| 2012/0296499 A1 | 11/2012 | Kirchhofer et al. | |
| 2013/0218374 A1* | 8/2013 | Lacko et al. | 701/16 |
| 2013/0327880 A1* | 12/2013 | Certain | 244/17.13 |

* cited by examiner fig.1 fig.2 fig.3 fig.4 fig.5 fig.6 fig.7

METHOD FOR THE GUIDANCE OF A ROTORCRAFT, WHICH METHOD LIMITS NOISE DISCOMFORT IN A PROCEDURE FOR THE APPROACH TO A LANDING POINT

CROSS REFERENCE TO RELATED APPLICATION

This application claims priority to French patent application No. 13 00472 filed Mar. 4, 2013, the disclosure of which is incorporated in its entirety by reference herein.

BACKGROUND OF THE INVENTION (1) Field of the Invention

The present invention lies in the area of methods and systems for guiding an aircraft—more specifically, a rotorcraft—during the approach to a landing point. More specifically, the present invention relates to such methods and systems that are organized so as to limit the noise discomfort generated by the rotorcraft within the environment near such a landing point, including, in particular, helicopter landing pads or heliports.

(2) Description of Related Art

The conditions governing the maneuvers of a rotorcraft approaching or departing from an identified and stored landing point are currently regulated. Within this context, it is customary to establish landing procedures to assist the pilot in guiding the rotorcraft, depending on the specific configuration of the environment near the landing point.

For example, one known approach to a given landing point consists of a procedure known as "VFR" (Visual Flight Rules). In a VFR procedure, the pilot of the rotorcraft relies on predefined approach instructions and external visual references, without receiving assistance from a piece of onboard equipment dedicated to the automated management of an approach trajectory to be followed. Such a VFR approach procedure requires that the pilot must have satisfactory visual contact with the landing point to be reached.

For example, another known approach to a given landing point consists of a procedure known as "IFR" (Instrument Flight Rules). In this case, the pilot has a piece of onboard equipment that allows the rotorcraft to be guided along a prescribed approach trajectory in order to reach the landing point.

The approach trajectory is defined by an approach route taken from an aeronautical database. In response to instructions from an air-traffic controller on the ground, the pilot selects, from the aeronautical database, an approach route that the rotorcraft should follow to the landing point. The approach route is commonly subdivided into several segments, in accordance with the identification of several waypoints. In particular, the following segments are defined:

an initial approach segment, defined between an initial approach fix (IAF) and an intermediate fix (IF);
an intermediate segment, defined between the intermediate fix (IF) and a final approach fix (FAF); and
a final approach segment (FAS), defined between the final approach fix (FAF) and a decision height or a decision point. The decision point is identified by coordinates stored in a predefined geodesic reference source, in accordance with a ground-height limit that the pilot of the rotorcraft takes into consideration in order to estimate whether he can or cannot complete the approach of the rotorcraft to the landing point. The decision point is commonly defined in accordance with a minimum descent altitude (MDA).

The current position of the rotorcraft is also detected—specifically, by means of instrumentation present on board the rotorcraft, which instrumentation includes, for example, a satellite navigation system, such as a Global Navigation Satellite System (GNSS). The rotorcraft is then guided by the pilot to the landing point, with a minimization of the difference between the current position of the rotorcraft and the approach trajectory previously constructed by the computation means.

It should be kept in mind that the guidance of the rotorcraft may be managed by a human pilot assisted by means for displaying the information that is necessary for the implementation of these procedures, and/or may be managed, at least in part, up to the decision point, by means of specific functions that are implemented by an automatic pilot (autopilot).

In order for a rotorcraft to be guided in accordance with an approach trajectory, consideration must be given to the frequent presence of wind, whose characteristics are identified in terms of speed and direction by instrumentation that, in particular, is present on board the rotorcraft. It is commonly acknowledged that the characteristics of the wind may vary, depending on the geographic location of the landing point and in accordance with the climatic conditions.

The wind affects the forward progress of the rotorcraft. Consequently, the position of the rotorcraft must be adjusted continuously by the pilot, depending on the characteristics of the wind as measured on board the rotorcraft, in order to maintain the forward progress of the rotorcraft in accordance with the approach trajectory. More specifically, the pilot continuously corrects any discrepancies between the current position of the rotorcraft and the previously constructed approach trajectory, depending on the effects of the wind on the forward progress of the rotorcraft, with the characteristics of the wind being measured by onboard instrumentation.

Furthermore, the regulated conditions regarding the forward progress of a rotorcraft in the environment around a landing point also include, depending on the local regulations, a minimum tolerated threshold for noise discomfort generated by the rotorcraft. Beyond the regulatory constraints, it is desirable to minimize, as much as possible, the noise discomfort generated by the rotorcraft in the environment around a landing point.

The noise discomfort generated by rotorcraft are particularly noticeable during the landing phase, because of the operational mode of the rotor during the descent phase of the rotorcraft and because of the position of the rotorcraft as it approaches the ground. In order to limit the effects of the noise discomfort generated by the rotorcraft, consideration should be given not only to the noises produced by the rotorcraft, but also to the conditions whereby the generated noise is propagated toward the ground.

It is known that the noise discomfort produced by a rotorcraft during the approach phase to, or during the departure phase from, a landing point can be limited. For this purpose, it is known that an approach trajectory can be constructed in accordance with the approach route, taking into consideration the forward progress of the rotorcraft, such that the rotorcraft generates a limited amount of noise discomfort toward the ground. The goal of these provisions is to limit the noise discomfort to which residents are subjected, limiting the said nuisance to a level below a predefined threshold of tolerated noise discomfort.

For this purpose, it is known that a supplemental database can be used that contains rotorcraft flight domains that should be avoided, because those domains generate noise discomfort that have been deemed excessive with regard to a predefined threshold of noise discomfort. The said flight domains are identified according to the forward-progress modes of a rotorcraft that has a given structure and a given mass, and that is moving along a given ground slope. The information contained in the supplemental database can be used to construct a rotorcraft approach trajectory in accordance with the previously selected approach route.

In this regard, reference may be made to the document identified as EP 1730032 (EUROCOPTER FRANCE), which describes such a supplemental database containing flight domains that should be excluded when an approach trajectory is defined, because those domains have been identified as generating excessive noise discomfort.

Furthermore, it is also known that a rotorcraft approach trajectory can be defined that is based on the selection of one or more approach routes that were previously identified for a given landing point. The said selection is made on the basis of real-time on-the-ground measurements of the noise produced by the rotorcraft, such that the noise discomfort generated by the rotorcraft approaching the landing point can be limited.

In this regard, reference may be made to the documents identified as EP 0945841 (INST. ADV. TECH. HELICOPTER) and JP 2736045 (COMMUTER HERIKOPUTA SENSHIN GI), which describe such methods for the construction of a rotorcraft approach trajectory toward a landing point that limits the noise discomfort generated by the rotorcraft.

Thanks to the document identified as US 2012/296499 (KIRCHHOFER, ALAIN), it is also known that a route to be followed by a rotorcraft can be constructed and displayed, so as to avoid overflying sites that are sensitive to the noise discomfort generated by the rotorcraft. The said sensitive sites were previously identified in accordance with the noise commonly produced by the rotorcraft during flight, and are displayed in conjunction with the route to be followed, overlying a map of the overflown terrain.

Within this context, the goal of the present invention is to propose a method and a system for guiding a rotorcraft on approach to an identified landing point while limiting, as much as possible, the noise discomfort generated by the rotorcraft.

BRIEF SUMMARY OF THE INVENTION

More specifically, the method according to the present invention is a method for the guidance of a rotorcraft in relation to a previously identified landing point, in accordance with a landing procedure that enables an optimized reduction of the noise discomfort generated by the rotorcraft.

The method according to the present invention is a method that includes the following operations:
- at least one in-flight operation for the selection of a previously identified approach route for the landing point. The approach route is selected from among a plurality of approach routes that are stored in an aeronautical database and that refer to identified landing points. The selected approach route defines a ground slope that should not be exceeded toward the ground by the rotorcraft from a final approach fix toward a decision point;
- at least one in-flight operation for the calculation of an approach trajectory for the previously selected approach route. The operation consisting of the calculation of the approach trajectory takes into consideration a combination of various criteria. These criteria include, in particular, at least the ground slope defined by the previously selected approach route; the current mass of the rotorcraft; and a low-noise or noise-abatement criterion relating to a forward-progress mode of the rotorcraft that has been identified as the source of reduced noise levels in relation to a predefined threshold for the noise produced by the rotorcraft;
- at least one operation for the identification of a current position of the rotorcraft by means of instrumentation, such as a satellite navigation system, located on board the rotorcraft; and
- an operation for guiding the rotorcraft along the previously calculated approach trajectory, with the correction of the position of the rotorcraft depending on how its forward progress is affected by a change in the wind characteristics, as identified by means of the instrumentation present on board the rotorcraft.

According to the present invention, the rotorcraft is equipped with a supplemental database that stores a plurality of typical trajectories that have been defined for at least one reference rotorcraft having a given structure that corresponds to the structure of the rotorcraft that is on approach to the landing point.

Obviously, it will be understood that such a supplemental database was constructed prior to its use on board the rotorcraft, such as, for example, through the application of the method described in document identified as EP 1730032.

The typical trajectories are defined through the application of the said low-noise or noise-abatement criterion in accordance with at least one given ground slope, based on a given mass of the reference rotorcraft and based on a wind criterion relating to the effects of a wind with given characteristics on an air mass within which the reference rotorcraft is performing its maneuvers.

Within this context, the method according to the present invention includes the following operations, which are performed while the rotorcraft is on approach toward the landing point:
- determining a wind model that is representative of the trend of the wind characteristics, as defined in terms of the wind speed and the wind direction, between a current position of the rotorcraft and the landing point;
- identifying, in the supplemental database, at least one typical trajectory that has been defined for the rotorcraft in terms of its structure, through the application of the low-noise or noise-abatement criterion based at least on the said ground slope of the previously selected approach route, and further based on the current mass of the rotorcraft and on the previously determined wind model; and then
- calculating at least one such approach trajectory, starting at a current position of the rotorcraft located upstream of the final approach fix, based on at least three successive segments that include, along the direction of forward progress of the rotorcraft toward the landing point:
  a) an upstream segment, whose extension is calculated through the application of the previously identified typical trajectory, between a current position of the rotorcraft and a transitional segment;
  b) a transitional segment, which extends between a point at the downstream end of the upstream segment and a point at the upstream end of a downstream segment of the approach trajectory. The transitional segment is calculated as being inscribed in an authorized flight space for the rotorcraft, as defined between the ground slope and a limit slope that passes through the point at the upstream end of the downstream segment. The transitional segment is calculated by excluding from its extension an application of the typical trajectory, and by means of the identification of a transition point that is determined by an intersection between the approach trajectory, on the one hand, and either the ground slope or the limit slope, on the other hand; and c) the said downstream segment, whose extension is predefined in relation to the decision point, based on the inherent ability of the rotorcraft to reach, during stable flight, the decision point from the point at the upstream end of the downstream segment.

Obviously, it will be understood that the concepts of "upstream" and "downstream" are relative concepts that should be taken into consideration collectively in terms of the direction of the forward progress of the rotorcraft toward the landing point.

The provisions of the present invention are such that the approach trajectory is calculated by taking into consideration the forward progress of the rotorcraft along the upstream segment, following an invariant approach trajectory within the air mass surrounding the rotorcraft. A displacement of the said air mass in relation to the ground, due to the effect of the wind influencing the forward progress of the rotorcraft, is taken into consideration by the implementation of the wind model in the identification of the typical trajectory, or even in the calculation of the approach trajectory based on the typical trajectory, as described below.

When the rotorcraft is guided along the upstream segment, any corrections in the position of the rotorcraft, due to the effect of the wind influencing its forward progress, are made in accordance with procedures involving a change in the attitude of the reduced-noise rotorcraft, as previously identified by the typical trajectory.

It will be noted that the provisions of the present invention also enable an advantageous correction of the approach trajectory as the rotorcraft moves forward toward the landing point, in accordance with an update of the calculation of the wind model based on iterative measurements of the wind characteristics, as performed by the instrumentation present on board the rotorcraft. Such iterative corrections are preferably made in order to define the approach trajectory on the basis of a wind model that was calculated beforehand, in accordance with the most relevant possible estimate of the actual effects of the wind influencing the forward progress of the rotorcraft. Such provisions make it possible to reduce the desired extension of the transitional segment as much as possible, by departing from the calculated approach trajectory while minimizing the noise produced by the rotorcraft.

However, the implementation of the wind model may nevertheless generate a shift in the position of the rotorcraft at the end of the upstream segment in relation to the decision point, based on the estimate made by the wind model of the actual wind characteristics influencing the forward progress of the rotorcraft toward the decision point. In order to remedy such a potential lack of relevance of the outcome of the calculation of the wind model, the transitional segment is defined according to the inherent ability of the rotorcraft to reach the decision point during rapid flight, while including, along the length of the downstream segment, a brief period of stable flight during which the rotorcraft moves forward toward the decision point.

Thanks to these features, the guidance of the rotorcraft along the upstream segment over a major portion of the approach trajectory takes place with reduced noise discomfort, regardless of the wind characteristics influencing the forward progress of the rotorcraft toward the decision point. The rapid maneuver consisting of guiding the rotorcraft along the transitional segment entails the generation of noise discomfort. However, such noise discomfort can be tolerated due to the position of the rotorcraft near the ground, and thus due to the limited size of the area on the ground that is subjected to these noise discomfort.

More specifically, the typical trajectory is defined, in particular, by a change in the ground height and by a change in the airspeed of the reference rotorcraft. Such changes in ground height and in airspeed are considered in relation to an air mass that is assumed to surround the reference rotorcraft and that itself is in motion due to the effect of a wind having certain given characteristics. Specifically, the said change in the ground height (H) and the said change in the airspeed (Vair) are identified according to the change in a distance, known as the "air distance", in relation to a reference point on the ground.

The approach trajectory is calculated on the basis of the identified typical trajectory, through the application, along the upstream segment, of the said change in the ground height and a change in the ground speed, as deduced from the said change in the airspeed of the identified typical trajectory.

As mentioned earlier, the calculation of the approach trajectory is preferably repeated iteratively in given sequences, based on a typical trajectory, as identified at an initial position of the rotorcraft located upstream of the final approach fix. The iterative calculation of the approach trajectory takes into consideration, during each of the sequences, a position of the rotorcraft that is treated as the current position, and corrects the approach trajectory on the basis of the typical trajectory, as identified in accordance with a current wind model as determined at the said position of the rotorcraft that is treated as its current position.

In one embodiment, it is treated as a point of departure for an approach trajectory, which point is located upstream of the final approach fix. The point of departure is defined by the calculation of an approach trajectory to a rotorcraft position located upstream of the final approach fix. In this context, the approach trajectory is calculated in accordance with the following steps:

before the rotorcraft passes the point of departure, the approach trajectory is calculated from the point at the upstream end of the downstream segment to the point of departure, on the basis of a previously identified typical trajectory; and after the rotorcraft passes the point of departure, whose position is then considered to have been frozen, the approach trajectory is calculated from the current position of the rotorcraft to the point at the upstream end of the downstream segment, on the basis of the said previously identified typical trajectory.

It will be noted that according to these arrangements, the calculation of the transitional segment is excluded from the calculation of the approach trajectory prior to the guidance of the rotorcraft along the upstream segment, because the characteristics of the wind to which the rotorcraft will be subjected along the upstream segment are unknown, such that it is therefore impossible to adjust the approach trajectory.

It will also be noted that, at each of the stages in the iterative calculation of the approach trajectory, and before the rotorcraft passes the point of departure for the approach trajectory, the position of the point of departure may vary, depending on the changes in the results of the calculation of the wind model.

In one example, the speed and direction characteristics of the wind model are determined through the application of a calculation rule that takes into consideration at least one calculation parameter relating to the characteristics of the terrain that is assumed to surround the landing point, and also taking into consideration the wind characteristics, as measured, at a minimum, by instrumentation present on board the rotorcraft, in order to determine the wind to which the rotorcraft is being subjected.

By default the value of the calculation parameter may also be defined according to an environment surrounding the landing point that is assumed to be flat.

By default, the value of the calculation parameter may be deduced according to characteristics of the wind, as measured on board the rotorcraft and at the landing point, respectively, taking into consideration, in particular, the differences between these characteristics as considered within the rotorcraft environment and at the landing point, respectively.

The characteristics of the wind model are preferably calculated by further taking into consideration the characteristics of the wind, as measured at the landing point and transmitted to the rotorcraft from the landing point. In particular, this information is transmitted by personnel on the ground who are in communication with the pilot of the rotorcraft. Alternatively, it may be transmitted automatically by instrumentation that is located on the ground and that measures the characteristics of the wind at the landing point.

In order to refine the calculation of the wind model, the calculation of the characteristics of the wind model may also take into consideration the characteristics of the wind, as measured at an altitude within the environment of the landing point and transmitted to the rotorcraft from the landing point. The characteristics of the wind as measured at an altitude may have been measured and transmitted to the landing point by aircraft that performed their maneuvers prior to the entry of the rotorcraft into the airspace surrounding the landing point.

The calculation rule includes, for example, a first law for the calculation of the speed in the wind model (V), according to which:

$$WS(h) = WS_0(h_0) * (h/h_0)^\alpha$$

in which first calculation law "WS(h)" is the wind speed at a given ground height "h" of the rotorcraft (1), "$WS_0(h_0)$" is the wind speed at the landing point at a ground height "$h_0$", and "$\alpha$" is the said calculation parameter.

In one embodiment, the wind model may be determined by treating as constant a wind direction between the landing point and a position that is treated as the current position of the rotorcraft. Such a constant wind direction may be deduced according to the characteristics of the wind, as measured either on board the rotorcraft or at the landing point. In such a case, it will obviously be understood that it makes no difference whether the constant direction of the wind is deduced from the characteristics of the wind as measured on board the rotorcraft or is deduced from the characteristics of the wind as measured at the landing point.

In another embodiment, the calculation rule includes a second law for the calculation of the wind direction. According to the second calculation law, the wind direction is calculated, for example, by interpolation between at least two measurements of the wind characteristics taken on board the rotorcraft and at the landing point, respectively, or at altitude.

In one embodiment, the limit slope is defined for a rotorcraft having a given structure in accordance with a limit on a vertical speed of the rotorcraft in relation to a predefined first threshold for a change in vertical speed. The limit slope is defined by calculation based on the operation consisting of the calculation of the approach trajectory, taking into consideration the said first threshold, along with a nominal airspeed of the rotorcraft at the point at the upstream end of the downstream segment, and the headwind component for the rotorcraft, as estimated by the wind model at the point at the upstream end of the downstream segment.

In particular, the limit slope is determined by calculation after the rotorcraft passes the point of departure and enters the upstream segment. The nominal airspeed taken into consideration at the point at the upstream end of the downstream segment is determined by the previously identified typical trajectory. More specifically, it is desirable to determine the limit slope as early as possible, and, in particular, to determine the limit slope as soon as the rotorcraft has passed the point of departure, on the basis of the nominal airspeed identified at the point of the upstream end of the downstream segment by the typical trajectory used in the calculation of the upstream segment.

In one example of the definition of the limit slope, the limit slope is more specifically defined in accordance with the following calculations:

$$Lh = \arctg \frac{Vzs_1}{\sqrt{Vair^2 - Vzs_1^2} - Vt}$$

in which "Lh" is the limit slope, "$Vzs_1$" is the first speed threshold, "Vain" is the nominal airspeed of the rotorcraft, and "Vt" is the said headwind component for the rotorcraft, all considered at the point at the upstream end of the downstream segment.

Obviously, it will be understood that, according to the foregoing calculations for the limit slope, for example, the limit slope is defined in relation to the ground, and, more particularly, by taking into consideration a horizontal orientation of the ground that is typically defined as being orthogonal to the direction of the force of gravity.

In particular, the downstream segment is predefined for a rotorcraft having a given structure, over a desired given period of time that is as brief as possible for a given constant slope. The said stable flight is treated as forward progress of the rotorcraft, at an acceleration that is deemed to be nil with a constant airspeed and a vertical speed of the rotorcraft that is limited in terms of a predefined second threshold for a change in vertical speed.

For illustrative purposes, and depending on the structure and of the equipment of the rotorcraft, the value of at least either the first threshold or the second threshold is between 500 feet/minute and 1,500 feet/minute.

More specifically, the operation consisting of guiding the rotorcraft employs:
  an operation consisting of comparing the current information provided by the onboard instrumentation and relating to a change in the current ground speed and a change in the current ground height of the rotorcraft against information calculated in relation to a change in the ground speed and a change in the ground height defining the approach trajectory; and
  an operation consisting of modifying the current position of the rotorcraft by guiding the rotorcraft in accordance with the application of a change in the ground speed and a change in the ground height defining the approach trajectory.

In one embodiment, the guidance of the rotorcraft is implemented by a human pilot who issues manual flight commands. In this case, the said comparison operation is performed by means of a display.

In one embodiment, the guidance of the rotorcraft is implemented by an autopilot. In this case, the said comparison operation is performed by means of a calculation, whose results are used by the autopilot to generate automated flight commands.

The present invention also relates to a system for the calculation of an approach trajectory that is suitable for the implementation of a guidance method for a rotorcraft as described hereinabove. Such a calculation system includes at least:
- a first communications interface between computation means, on the one hand, and a so-called "aeronautical database" and a so-called "supplemental database", on the other hand;
- a second communications interface between the computation means and display means;
- a third communications interface between the computation means and the onboard instrumentation of a rotorcraft. The onboard instrumentation includes, in particular, at least one device for the detection of the forward speed of the rotorcraft (specifically, an anemometer), associated with means for determining the characteristics of the wind surrounding the rotorcraft, a satellite navigation system, and means for assessing the current mass of the rotorcraft. The current mass of the rotorcraft includes, in particular, the inherent structural mass of the rotorcraft, the mass of the fuel on board, and the mass of any cargo or payloads; and
- a fourth communications interface between the computation means and means for the remote transmission of data. Such remote transmission means are currently present on board rotorcraft in order to allow the pilot to communicate with ground personnel.

The said computation means include, at a minimum:
a) a first computer for determining the wind model according to the information transmitted at least by the third communications interface, if not also by the fourth communications interface;
b) means for the selection by a pilot of an approach route from among the approach routes stored in the aeronautical database. In particular, such selection means are employed by the pilot for a given landing point in accordance with instructions from ground personnel transmitted via the said means for the remote transmission of data;
c) a second computer for selecting a typical trajectory from among the typical trajectories stored in the supplemental database. The typical trajectory is selected automatically by the second computer, based on the information transmitted by the first communications interface and by the third communications interface, and according to the wind model previously determined by the first computer; and
d) a third computer for defining the approach trajectory in accordance with a previously selected typical trajectory and in accordance with the information transmitted by the third communications interface, particularly so that the calculation of the approach trajectory can take into consideration the characteristics of the wind surrounding the rotorcraft at a position that is treated as its current position.

BRIEF DESCRIPTION OF THE SEVERAL VIEWS OF THE DRAWINGS

The present invention also relates to a rotorcraft equipped with a computer system as described hereinabove.

Examples of embodiments of the present invention will now be described with reference to the figures on the attached sheets, on which.

DETAILED DESCRIPTION OF THE INVENTION

Figure 1:
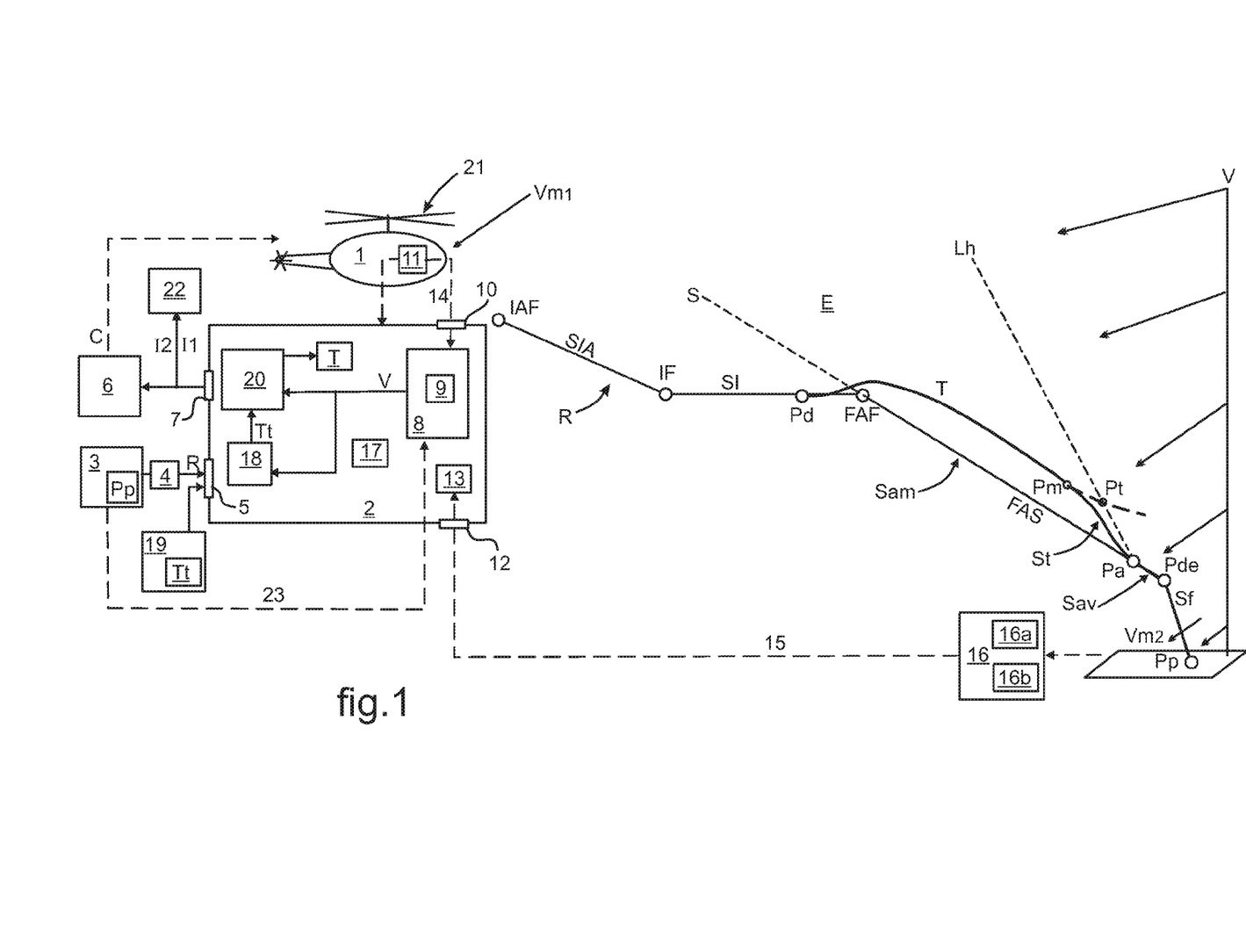
FIG. 1 is a diagram illustrating a method for the calculation of an approach trajectory to a landing point, in one embodiment of a method for the guidance of a rotorcraft according to a landing procedure as described in the present invention.

In FIG. 1, a rotorcraft (1) is on approach to a landing point (Pp)—specifically, a heliport or a helicopter pad. The rotorcraft (1) has computing means (2) for calculating an approach trajectory (T) that should be followed by the rotorcraft (1), in accordance with a predefined approach route (R). The approach route (R) is taken from an aeronautical database (3) that stores a plurality of landing points (Pp). At least one specific approach route (R) is associated with each of the stored landing points (Pp), with the said approach route (R) defining various waypoints for the rotorcraft (1).

In order to extract from the aeronautical database (3) the approach route (R) to be taken into consideration, the pilot has means (4) for selecting the correct approach route (R) to the landing point (Pp) toward which the rotorcraft (1) is on approach. The computation means (2) are linked to the aeronautical database (3) by means of a first communications interface (5) that allows the said computation means (2) to process the data stored by the aeronautical database (3). The approach route (R) is traditionally divided into a plurality of successive route segments along the direction of the forward progress of the rotorcraft (1) toward the landing point (Pp).

More specifically, the approach route (R) currently includes:
- an initial approach segment (SIA), which is defined between an initial approach fix (IAF) and an intermediate fix (IF). The initial approach segment (SIA) is entered by the rotorcraft (1) maneuvering at altitude and heading toward the landing point (Pp);
- an intermediate segment (SI), defined between the intermediate fix (IF) and a final approach fix (FAF). The intermediate segment (SI) allows the pilot to adjust the speed of forward progress and the position of the rotorcraft (1) in order to enter, during stable flight, a subsequent final approach segment (FAS). Traditionally, the intermediate segment (SI) corresponds to an incremental approach by the rotorcraft to the final approach segment (FAS); and the so-called final approach segment (FAS), which is defined between the final approach fix (FAF) and the landing point (Pp). The final approach segment (FAS) defines an imposed ground slope (S) that the rotorcraft (1) should not exceed toward the ground.

More specifically, the final approach segment (FAS) extends from the final approach fix (FAF) to a decision point (Pde) defined in accordance with a minimum descent altitude (MDA). The MDA is determined in relation to a landing point (Pp), and usually defines a terminal segment (Sf) of the approach trajectory (T). The MDA and the minimum descent height (MDH) are ground height limits that the pilot of the rotorcraft (1) takes into consideration when making his decision whether or not to complete the approach of the rotorcraft (1) to the landing point (Pp). The MDA and the MDH are usually regulated in accordance with the approach procedure used by the pilot during instrument flight, particularly as a function of the pilot's rating and of the structure and equipment of the rotorcraft (1).

Based on the approach route (R) taken from the aeronautical database (3), the computation means (2) construct the approach trajectory (T) for the rotorcraft (1) toward the decision point (Pde).

The guidance of the rotorcraft (1) is managed by a pilot (6) who issues flight instructions (C) that modify the behavior of the rotorcraft (1) in order to follow the previously calculated approach trajectory (T). Such a pilot (6) may be an autopilot or a human pilot.

The flight commands (C) are issued by the pilot (6), who compares current information (I1) relating to the change in a current ground speed and to the change in a current ground height of the rotorcraft (1) against calculated information (I2) relating to the change in a ground speed and to the change in a ground height defining the previously calculated approach trajectory (T). Such information (I1) and (I2) is preferably communicated to a human pilot through display means (22) with which the rotorcraft (1) is equipped, and which are linked to the computation means (2) through a second communications interface (7).

It is desirable to limit, as much as possible, the noise discomfort generated by the rotorcraft (1) during the approach phase to the landing point (Pp). For this purpose, the approach directory (T) is calculated by taking into consideration the modes of forward progress of the rotorcraft (1) that were previously identified as generating less noise. Such forward-progress modes are identified by taking into consideration the effects of the wind to which the rotorcraft (1) is potentially subjected.

More specifically, the noise emitted by a rotorcraft depends on its displacement within the air mass surrounding it, and the noise discomfort generated by the rotorcraft depend on the conditions for the propagation of the noise that the rotorcraft generates.

The approach trajectory (T) is calculated such that the rotorcraft (1) is guided over a majority of the approach trajectory (T) in an invariant manner in relation to the air mass surrounding the rotorcraft (1), while allowing the rotorcraft (1) to reach the decision point (Pde) through a maneuver for correcting the position of the rotorcraft (1) that is calculated to be as brief as possible.

Within this context, the calculation means (2) include a first computer (8) for determining the characteristics of a wind model (V). The first computer (8) incorporates a calculation rule (9) for the wind model (V) in accordance with various pieces of information, such as information relating to the terrain surrounding the landing point (Pp) and information relating to the characteristics ($Vm_2$) and ($Vm_1$) of the wind, as taken into consideration at the landing point (Pp) and in the environment surrounding the rotorcraft (1), respectively.

The information processed by the first computer (8) in order to determine the wind model (V) is collected by the computation means (2) through the various communications interfaces.

More specifically, the first communications interface (5) is potentially employed to collect, from the aeronautical database (3), the information pertaining to a calculation parameter (23) that is used to determine the wind model. This calculation parameter (23) is inherent in the characteristics of the terrain surrounding the landing point (Pp).

The computation means (2) are also linked, by means of a third communications interface (10), with instrumentation (11) present on board the rotorcraft, and are linked, by means of a fourth communications interface (12), with means (13) for the remote transmission of data, with which means the rotorcraft (1) is equipped.

The onboard instrumentation (11) provides information (14) about the characteristics of the wind surrounding the rotorcraft (1), and the said information (14) is transmitted to the first computer (8).

The means (13) for the transmission of data are used to collect information (15) about the characteristics ($Vm_2$) of the wind as measured at the landing point (Pp) and communicated from the ground by means of a communications system (16) operated by ground personnel (16a) or by means of instrumentation (16b) for measuring the characteristics ($Vm_2$) of the wind at the landing point (Pp).

Input means (17) allow the pilot (6) to enter the information (15) communicated by the communications system (16) so that the said information can be processed by the computation means (2).

The computation means (2) also include a second computer (18) for the selection of a typical trajectory (Tt) extracted from a supplemental database (19) that stores a plurality of typical trajectories (Tt). The stored typical trajectories (Tt) are identified individually, for a rotorcraft (1) having a given structure, according to a given mass of the rotorcraft (1), according to a given slope, and according to the forward-progress mode of the rotorcraft (1) previously identified as a generator of reduced noise, taking into consideration the effects on the forward progress of the rotorcraft (1) that are produced by a given wind to which the rotorcraft (1) is subjected.

The second computer (18) selects a typical trajectory (Tt) to be used, which trajectory has been identified as enabling forward progress of the rotorcraft (1) with less noise along the ground slope (S) imposed in accordance with the approach route (R), depending on the current mass of the rotorcraft (1) and in accordance with the characteristics of the wind model (V), as previously calculated.

The typical trajectory (Tt) selected by the second computer (18) is used by a third computer (20) to calculate the approach trajectory (T). Consideration should be given to the fact that the various computers (8), (18), and (20) may potentially be incorporated into a single computation tool.

The incorporation of a wind model (V) in the calculation of the approach trajectory (T) makes it possible to define reduced-noise guidance modes for the rotorcraft (1), despise any differences in the position of the rotorcraft (1) that need to be corrected due to the effect of the wind on the forward progress of the rotorcraft (1) along the approach trajectory (T).

However, the inclusion of the wind effects through the calculation rule (9) for the forward-progress modes of the rotorcraft (1) along the approach route (R) may generate a positional difference between the position of the rotorcraft (1) and the decision point (Pde) at the end of an upstream segment (Sam) of the approach trajectory (T), as calculated through the use of the wind model (V). Indeed, it is likely that the rotorcraft (1) may be subjected to wind gusts and/or to a wind whose actual characteristics are different from the outcome of the application of the calculation rule (9).

Such a potential lack of relevance of the approach trajectory (T) randomizes the position of the rotorcraft (1) in relation to the decision point (Pde) at the end of the approach trajectory (T). In order to address such a defect, it has been proposed that the approach trajectory (T) be subdivided into a plurality of successive segments.

Such successive segments include—considered in accordance with the direction of the forward progress of the rotorcraft (1) toward the landing point (Pp), an upstream segment (Sam), a transitional segment (St), and a downstream segment (Sav). The concepts of "upstream" and "downstream" should be taken into consideration in terms of the direction of the forward progress of the rotorcraft (1) toward the landing point (Pp).

The upstream segment (Sam) is calculated by applying the typical trajectory (Tt) that was extracted from the supplemental database (19).

The rotorcraft (1) is guided along the upstream segment (Sam) through the processing of the calculated information (I2) derived from the calculation of the approach trajectory (T), and through the processing of the current information (I1) derived from the change in the ground height and from the change in the ground speed of the rotorcraft (1). Display means (22) allow the pilot to view the calculated information (I2) that defines the approach trajectory (T), and the current information (I1) provided by the instrumentation (11) present on board the rotorcraft that identifies the current position of the rotorcraft (1).

In the event of the presence of wind in the environment of the rotorcraft (1), it is desirable for the calculation of the approach trajectory (T) to take into consideration the characteristics ($Vm_1$) of the wind surrounding the rotorcraft (1), which characteristics are measured by the onboard instrumentation (11). The characteristics ($Vm_1$) of the wind surrounding the rotorcraft (1) are taken into consideration during the calculation of the wind model (V).

The approach trajectory (T) is calculated iteratively, taking into consideration the current characteristics ($Vm_1$) of the wind surrounding the rotorcraft (1) as the rotorcraft moves along a previously calculated approach trajectory, such that the movement of the rotorcraft (1) along the upstream segment (Sam) is invariant in relation to the air mass surrounding the rotorcraft, with the calculation of the approach trajectory (T) being based on the typical trajectory (Tt).

The reduced-noise guidance of the rotorcraft (1) is obtained in spite of any maneuvers that may be performed in order to adjust the position of the rotorcraft (1) along the approach trajectory (T) due to the effect of the wind on the forward progress of the rotorcraft (1) along the approach trajectory (T). The wind characteristics taken into consideration in the calculation of the approach trajectory (T) along the upstream segment (Sam) are the characteristics that were estimated by the previously determined wind model (V), with the guidance of the rotorcraft (1) being implemented through maneuvers that have been identified as generators of reduced noise by the previously selected typical trajectory (Tt).

The transitional segment (St) is interposed between the upstream segment (Sam) and the downstream segment (Sav). The extension of the transitional segment (St) is calculated with the exclusion of the application of the typical trajectory (Tt). More specifically, along the transitional segment (St), the application of the typical trajectory (Tt) is interrupted so that the calculation of the extension of the transitional segment (St) can take into consideration the rapid guidance of the rotorcraft (1) from its current position at the end of the upstream segment (Sam) toward the downstream segment (Sav).

The propagation of the noise produced by the rotorcraft (1) along the transitional segment (St) is tolerated due to the position of the rotorcraft (1) near the ground, and thus due to the fact that the noise discomfort generated by the rotorcraft are directed toward an area on the ground that is limited to such a position of the rotorcraft (1) near the ground.

The transitional segment (St) is calculated through the identification of a transition point (Pt) whose position is defined in accordance with the ability of the rotorcraft (1) to reach rapidly, from the upstream segment (Sam) and under favorable flight conditions, a point at the upstream end (Pa) of the downstream segment (Sav). The ability of the rotorcraft (1) to maneuver, in rapid flight and under favorable flight conditions, between two points on the trajectory is identified by taking into consideration, in particular, the inherent structure of the rotorcraft (1) and the capability of its motor, its current mass, and its structural resistance to stresses, particularly with regards to the loads that are borne by a main rotor (21) that provides the support for the rotorcraft (1).

More specifically, the transition point (Pt) is a point for the calculation of the transitional segment (St) that extends between a point at the downstream end (Pm) of the upstream segment (Sam) and the point at the upstream end (Pa) of the downstream segment (Sav).

In the example of the approach trajectory (T) shown here, the transition point (Pt) is identified by an intersection between a previously calculated approach trajectory (T) and a limit slope (Lh) defining, in conjunction with the ground slope (S), an authorized flight space (E) for the rotorcraft (1). Nevertheless, it is possible for the transition point (Pt) to be identified by an intersection between a previously calculated approach trajectory (T) and the ground slope (S), depending on the trend of the characteristics ($Vm_1$) of the wind to which the rotorcraft (1) is subjected as it moves along the approach trajectory (T).

The limit slope (Lh) passes through the point at the upstream end (Pa) of the downstream segment (Sav), and is defined in accordance with a limitation on the vertical speed of the rotorcraft (1) in relation to a predefined first threshold for a change in vertical speed, whose value, for illustrative purposes, is between 500 feet/minute and 1,500 feet/minute, depending on the structure of the rotorcraft (1). Consideration is also given to a nominal airspeed of the rotorcraft (1) and to the headwind component for the rotorcraft (1), the characteristics of which component are estimated by the wind model (V) at the point at the upstream end (Pa) of the downstream segment (Sav).

The downstream segment (Sav) is predefined by taking into consideration the ability of the rotorcraft (1) to reach the decision point (Pde) during stable flight. The downstream segment (Sav) is predefined to be as brief as possible, depending on the ability of the rotorcraft to reach, during stable flight, the decision point (Pde) from the upstream point (Pa) of the downstream segment (Sav). In particular, such stable flight conditions are identified over a given period that is predefined to be as brief as possible, taking into consideration a given constant slope and a change in the vertical speed of the rotorcraft (1) that is limited, in terms of a predefined second threshold for a change in vertical speed, to a value that, for illustrative purposes, is between 500 feet/minute and 1,500 feet/minute, depending on the structure of the rotorcraft (1). The stable flight of the rotorcraft is treated as forward progress of the rotorcraft (1), at an acceleration deemed to be nil, with a constant airspeed.

These arrangements are such that the reduced-noise forward progress of the rotorcraft (1) is optimized, over the majority of the approach trajectory (T) along the upstream segment (Sam), at a ground height for the rotorcraft (1) at which the noise discomfort generated by the propagation of the noise produced by the rotorcraft (1) are significant. The rotorcraft (1) then proceeds along the transitional segment (St) and the downstream segment (Sav) while tolerating the noise that it produces, over a brief portion of the approach trajectory (T) and with the rotorcraft (1) in a position close to the ground, where the surface area of the ground affected by the noise discomfort generated by the propagation of the noise produced by the rotorcraft (1) is of limited size.

The approach trajectory (T) is calculated iteratively in accordance with the forward progress of the rotorcraft (1), based on a previously selected typical trajectory, as described below. During each of the calculations of the approach trajectory (T) that are repeated in accordance with the forward progress of the rotorcraft (1) along a previously calculated approach trajectory (T), the approach trajectory (T) is adjusted depending on the characteristics of the wind model (V), as those characteristics are determined at the current position of the rotorcraft (1).

More specifically, in order to optimize the relevance of the calculation of the upstream segment (Sam) and in order to reduce the path of the rotorcraft (1) as defined by the transitional segment (St), the approach trajectory (T) is calculated iteratively in accordance with the characteristics of the wind model (V), as that model is determined at the various successive current positions of the rotorcraft (1) as the rotorcraft progresses along a previously calculated approach trajectory (T).

The typical trajectory (Tt) is selected before the rotorcraft (1) passes a point of departure (Pd) on the approach trajectory (T) that is located upstream of the final approach fix (FAF) or that is even identical to the final approach fix (FAF).

Obviously, it will be understood that the concept of "departure" refers to a point at the upstream end of the calculated approach trajectory (T), and, more specifically, to a point at the upstream end of the upstream segment (Sam). The typical trajectory (Tt) is selected at a current position of the rotorcraft (10 located on the approach route (R) upstream of the final approach fix (FAF).

Before the point of departure (Pd) is passed, the approach trajectory (T) is calculated in the reverse of the direction of the forward progress of the rotorcraft (1) toward the landing point, i.e., from the point at the upstream end (Pa) of the downstream segment (Sav) toward the current position of the rotorcraft (1). Within this context, the calculation of the transitional segment (St) is temporarily excluded from the calculation of the approach trajectory (T), provided that the rotorcraft (1) has not passed the point of departure (Pd).

When the rotorcraft (1) passes the point of departure (Pd), the limit slope (Lh) is determined through the identification of the normal airspeed, in accordance with the application of the typical trajectory (Tt) and of the said headwind component to the basis for the calculated wind model. The identified limit slope (Lh) is then used to calculate the transitional segment (St) during the operations for the iterative calculation of the approach trajectory (T).

The approach trajectory (T) is calculated from the current position of the rotorcraft (1) toward the point at the upstream end (Pa) of the downstream segment (Sav). The approach trajectory (T) is then calculated with the inclusion of the calculation of the transitional segment (St). The approach trajectory (T) is calculated iteratively through the application of the typical trajectory (Tt) and through corrections of the approach trajectory (T) as deduced from the application of the typical trajectory (Tt) according to the wind models (V), respectively, as determined at different successive current positions of the rotorcraft (1) as it moves along a previously calculated approach trajectory (T).

Figure 2:
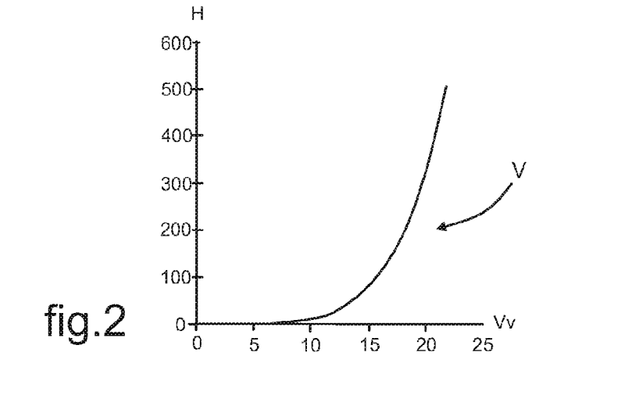
FIG. 2 is a diagram illustrating one example of a wind model employed to calculate an approach trajectory method for the calculation in accordance with the implementation of a method as described in the present invention.

In FIG. 2, the characteristics of the wind model (V) are determined through the application of the calculation rule in accordance with the following formula: $WS(h) = WS_0(h_0) * (h/h_0)^\alpha$. In this calculation rule, "WS(h)" is the wind speed at a given ground height "h" of the rotorcraft, "$WS_0(h_0)$" is the wind speed near the ground, as measured at the landing point at a ground height "$h_0$", and "$\alpha$" is a calculation parameter associated with the characteristics of the terrain surrounding the landing point.

The concept of ground proximity should be evaluated in accordance with the location of the measurement instrument used to measure the characteristics of the wind at the landing point.

The example shown in FIG. 2 assumes a constant direction of the wind model (V). The results of the application of the calculation rule are illustrated by a ground-height indicator (H) that varies in accordance with a wind speed (Vv), as measured 10 meters from the ground, that is on the order of 10 meters/second, and for a said calculation parameter of 0.2, which corresponds to ground terrain that is essentially flat.

Nevertheless, it should be kept in mind that the wind model (V) can be calculated on the basis of wind characteristics that are measured uniquely, either on board the rotorcraft or at the landing point. In particular, the wind characteristics that are measured on board the rotorcraft by the onboard instrumentation are used alone whenever the characteristics of the wind, as measured at the landing point, are unavailable.

It should also be kept in mind that a default value for the calculation parameter may be used on the basis of ground terrain that is essentially flat, as mentioned hereinabove, or on the basis of a value for the calculation parameter that is calculated according to knowledge of the wind characteristics, as measured at the landing point and on the board the rotorcraft, respectively.

Figure 3:
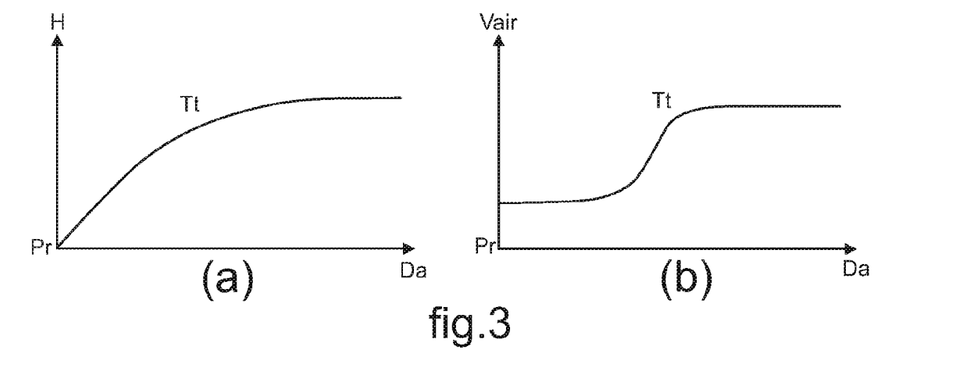
FIG. 3 consists of two diagrams, "a" and "b", collectively defining one example of a typical trajectory used for the calculation of an approach trajectory in accordance with the implementation of a method as described in the present invention.

FIG. 3 consists of two diagrams, "a" and "b", which illustrate a typical trajectory (Tt) that is identified in relation to a reference point (Pr) located on the ground, shown in an orthonormal system. A ground-height variation shown in diagram "a" and an airspeed variation shown in diagram "b" are defined as a function of a change in a so-called "air distance" (Da) in relation to a reference point (Pr) on the ground. The "air distance" corresponds to a distance to be traveled by the rotorcraft in an air mass that is in motion at a speed and in a direction corresponding to the characteristics of a given wind. The typical trajectory is selected from among the typical trajectories stored in the supplemental database, through the application of given characteristics of a wind, which characteristics were identified through the calculation of the wind model.

A rotorcraft approach trajectory to a previously identified landing point may be calculated through the conversion of the said "air distance" into ground distance, as a function of the airspeed of the rotorcraft and of the wind, whose characteristics are derived from the calculated wind model. More specifically, the said conversion is performed through the calculation of the ground speed along the previously identified approach route, based on the airspeed of the rotorcraft, as measured by the onboard instrumentation and based on the characteristics of the wind to which the rotorcraft may be subjected, which characteristics were identified by the wind model. The ground distance to be covered by the rotorcraft is deduced from the said ground speed, by integration over time.

As mentioned earlier with regard to the example shown in FIG. 1, such a typical trajectory (Tt) is taken from a supplemental database with which a rotorcraft is equipped, so that an approach trajectory (T) for this rotorcraft toward a landing point can be calculated in accordance with a previously identified approach route (R).

Figure 4:
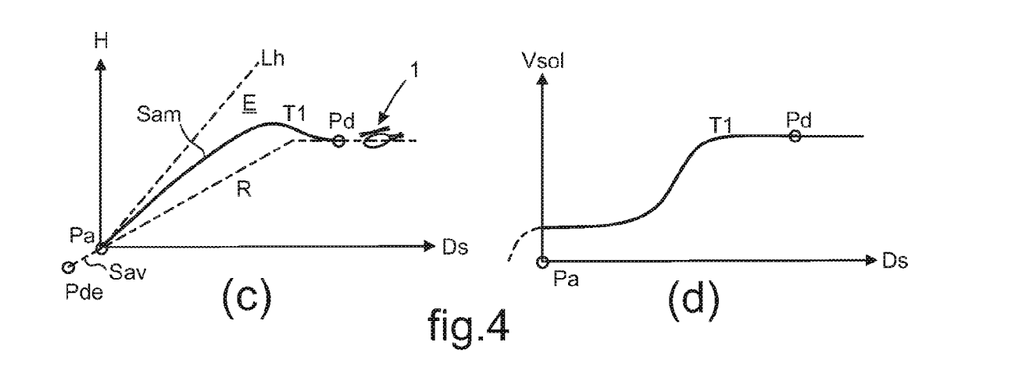
FIG. 4 consists of two diagrams, "c" and "d", collectively defining one example of a first approach trajectory calculated at a first current position of the rotorcraft progressing toward a landing point, in accordance with the implementation of a method as described in the present invention.
Figure 5:
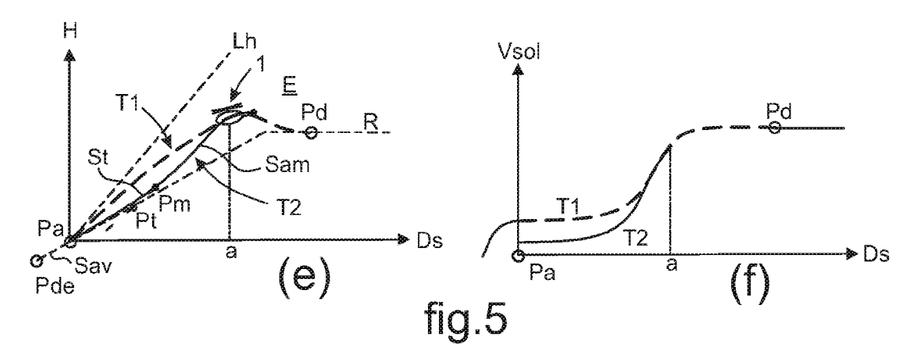
FIG. 5 consists of two diagrams, "e" and "f", collectively defining a first example of the first approach trajectory shown in FIG. 4, according to a calculation of the approach trajectory to a second current position of the rotorcraft progressing toward the landing point, in accordance with the implementation of a method as described in the present invention.
Figure 6:
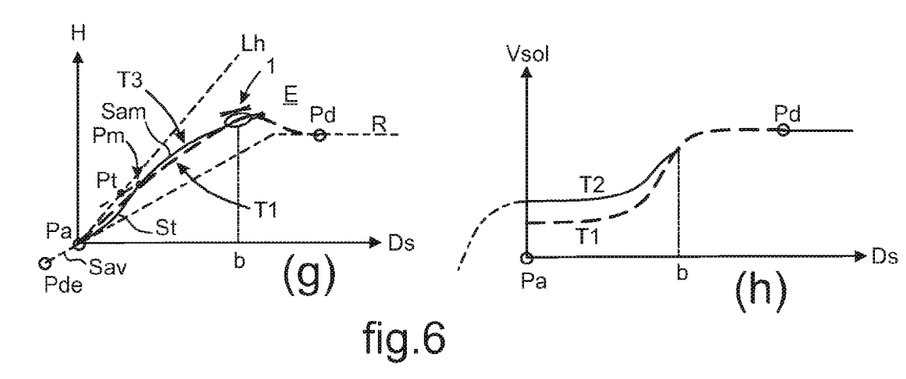
FIG. 6 consists of two diagrams, "g" and "h", collectively defining a second example of the first approach trajectory shown in FIG. 4, according to a calculation of the approach trajectory to a third current position of the rotorcraft progressing toward the landing point, in accordance with the implementation of a method as described in the present invention.

In FIGS. 4, 5, and 6, the approach trajectory (T1 for FIG. 4, T2 for FIG. 5, and T3 for FIG. 6) is calculated through the use of a typical trajectory taken from a said supplemental database, as mentioned hereinabove. Such a typical trajectory (such as, for example, the typical trajectory (Tt) shown in FIG. 3) takes into consideration a wind model that was previously calculated in accordance with the implementation of the method that is the subject of the present invention, such as, for example, the wind model (V) shown in FIG. 2.

The approach trajectories (T1), (T2), and (T3) are calculated through the application of the typical trajectory along an upstream segment (Sam) of the approach trajectories (T1), (T2), and (T3). More specifically, the upstream segment (Sam) is calculated for the application, along the upstream segment (Sam), of the said change in the ground height (H) and a change in the ground speed (Vsol), as deduced from the said change in the airspeed (Vair) of the typical trajectory.

The rotorcraft maneuvers along a previously calculated approach trajectory (T1), (T2), or (T3) within an authorized flight space (E) for the rotorcraft (1). The flight space (E) is bounded by a vertical plane defined by the gravity between a limit slope (Lh) previously identified by calculation, and a ground slope (S) imposed by a previously selected approach route (R). It should be noted that, in contrast to the customary practices in the area of the definition of an approach trajectory for a rotorcraft toward a landing point, the calculated approach trajectories (T1), (T2), and (T3) potentially diverge from the ground slope (S) while still remaining contained within the flight space (E). Such a divergence is induced when the calculation of the approach trajectories (T1), (T2), and (T3) takes into consideration the wind model and a predefined typical trajectory (Tt) that may differ from the imposed ground slope of the approach route (R).

In FIG. 4, the rotorcraft (1) proceeds upstream of a point of departure (Pd) of a first approach trajectory (T1). So long as the rotorcraft (1) has not passed the point of departure (Pd), the first approach trajectory (T1) and, more specifically, the upstream segment (Sam) are calculated from the point at the upstream end (Pa) of the downstream segment (Sav) toward the point of departure (Pd).

After the rotorcraft (1) has passed the point of departure (Pd), as illustrated in FIG. 5 and FIG. 6, the approach trajectories (T2) and (T3), and, more specifically, the upstream segment (Sam) and the transitional segment (St) for these approach trajectories (T2) and (T3), are calculated from the current position of the rotorcraft (1) to the point at the upstream end (Pa) of the downstream segment (Sav). The approach trajectories (T2) and (T3) are now calculated iteratively, with the correction of the characteristics in accordance with the wind model as calculated at the current position of the rotorcraft (1), as indicated in relation to the ground at point "a" on the diagrams shown in FIG. 5 and at point "b" on the diagrams shown in FIG. 6.

In the example of an embodiment illustrated in FIG. 5, the speed of the headwind to which the rotorcraft (1) is subjected is increasing. A second trajectory (T2) is calculated in order to define the upstream segment (Sam) and the transitional segment (St). The location of a transition point (Pt), based on which the transitional segment (St) is calculated, is defined by the intersection between the second approach trajectory (T2) and the ground slope (S) imposed by the approach route (R).

In the example of an embodiment illustrated in FIG. 6, the speed of the headwind to which the rotorcraft (1) is subjected is decreasing. A third approach trajectory (T3) is calculated in order to define the upstream segment (Sam) and the transitional segment (St). The location of a transition point (Pt), based on which the transitional segment (St) is calculated, is defined by the intersection between the third approach trajectory (T3) and the limit slope (Lh).

Figure 7:
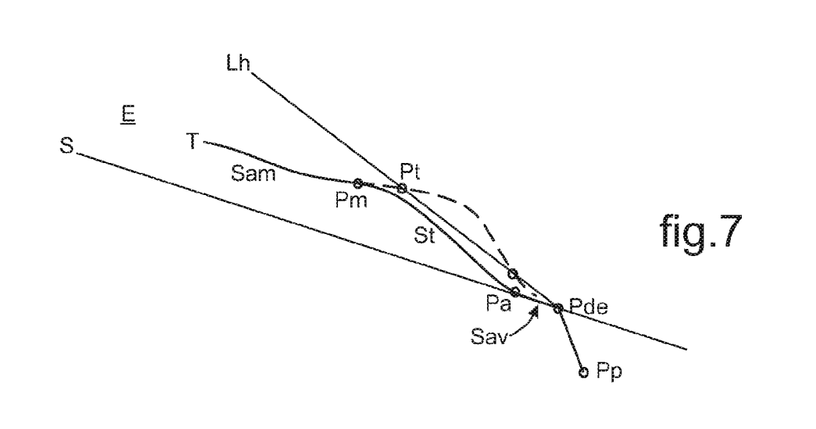
FIG. 7 is an illustration of one example of the calculation of a transitional segment that includes an approach trajectory calculated in accordance with the implementation of a method as described in the present invention.

In FIG. 7, an approach trajectory (T) is calculated in accordance with the steps described in FIG. 1. An authorized flight space (E) for the rotorcraft is defined between a ground slope (S) imposed by the approach route and a limit slope (Lh). The limit slope (Lh) passes through the point of the upstream end (Pa) of the downstream segment (Sav). The flight space (E) makes it possible to identify a transition point (Pt) based on an intersection between the approach trajectory (T), on the one hand, and either the ground slope (S) or the limit slope (Lh), on the other hand. The identification of the transition point (Pt) makes it possible to calculate the transitional segment (St) between a downstream point (Pm) of the upstream segment (Sam) and the point at the upstream end (Pa) of the downstream segment (Sav).

More specifically, the approach trajectory (T) is calculated according to the method that is the subject of the present invention. The transition point (Pt) is identified by the intersection between the approach trajectory (T) and the limit slope (Lh). The approach trajectory (T) potentially cuts the limit slope (Lh) or the ground slope (S) into several intersection points. In this case, for the definition of the transition point (Pt), consideration is given to the upstream intersection point between the approach trajectory (T), on the one hand, and either the flight limit (Lh) or the ground slope (S).

In the example shown in FIG. 7, the approach trajectory (T) cuts the flight limit (Lh) into two intersection points. The transition point (Pt) is defined by the upstream intersection point between the approach trajectory (T) and the flight limit (Lh).

What is claimed is:

1. A method for the guidance of a rotorcraft in relation to a landing point in accordance with a landing procedure, which method includes the following operations:
   with an approach route being selected from among a plurality of approach routes that are stored in an aeronautical database and that refer to identified landing points, with the selected approach route defining a ground slope that should not be exceeded toward the ground by the rotorcraft from a final approach fix toward a decision point;
   at least one in-flight operation for the calculation of an approach trajectory for the selected approach route, with the operation comprising the calculation of the approach trajectory taking into consideration a combination of various criteria, including at least the ground slope defined by the selected approach route; a current mass of the rotorcraft; and a low-noise or noise-abatement criterion relating to a forward-progress mode of the rotorcraft, the forward-progress mode having been identified as a source of low noise in relation to a predefined threshold for the noise produced by the rotorcraft;

at least one operation for the identification of a current position of the rotorcraft by instrumentation present on board the rotorcraft; and an operation for guiding the rotorcraft along the calculated approach trajectory, with a correction of the position of the rotorcraft depending on how the rotorcraft forward progress is affected by a change in wind characteristics, as identified by the instrumentation on board the rotorcraft;

wherein the rotorcraft is equipped with a supplemental database storing a plurality of standard trajectories that are defined for at least one reference rotorcraft having a given structure that corresponds to the structure of the rotorcraft that is on approach to the landing point, and with the standard trajectories being defined through the application of the low-noise or noise-abatement criterion in accordance with at least one given ground slope, based on a given mass of the reference rotorcraft and based on a wind criterion relating to the effects of a wind with given characteristics on an air mass within which the reference rotorcraft is performing maneuvers, and wherein the at least one in-flight operation for the calculation of an approach trajectory includes the following operations, which are performed while the rotorcraft is on approach toward the landing point;

determining a wind model that is representative of a trend of the wind characteristics, as defined in terms of wind speed and wind direction, between a current position of the rotorcraft and the landing point;

identifying, in the supplemental database, at least one typical trajectory that has been defined for the rotorcraft in terms of the structure of the rotorcraft, through the application of the low-noise or noise-abatement criterion based at least on the ground slope of the selected approach route, the current mass of the rotorcraft and the determined wind model; and then calculating at least one approach trajectory, starting at a current position of the rotorcraft located upstream of the final approach fix, based on at least three successive segments that include, along the direction of forward progress of the rotorcraft toward the landing point:

a) an upstream segment, having an extension calculated through the application of the identified typical trajectory, between a current position of the rotorcraft and a transitional segment;

b) the transitional segment, extending between a point at a downstream end of the upstream segment and a point at an upstream end of a downstream segment of the approach trajectory, in an authorized flight space for the rotorcraft, as defined between the ground slope and a limit slope that passes through the point at the upstream end of the downstream segment, with the transitional segment being calculated by excluding an application of the typical trajectory from the extension of the transitional segment, and by the identification of a transition point that is determined by an intersection between the approach trajectory, and either the ground slope or the limit slope; and c) the downstream segment, having an extension predefined in relation to the decision point, based an inherent ability of the rotorcraft to reach, during stable flight, the decision point from the point at the upstream end of the downstream segment.

2. The method according to claim 1, wherein the typical trajectory is defined by a change in the ground height and by a change in the airspeed of the rotorcraft in relation to an air mass that is assumed to surround the reference rotorcraft and that is in motion due to the effect of a wind having certain given characteristics, with the change in the ground height and the change in the airspeed being identified according to the change in a distance, known as the "air-distance" in relation to a reference point on the ground; and the approach trajectory is calculated on the basis of the identified typical trajectory, through the application, along the upstream segment, of the change in the ground height and a change in the ground speed, as deduced from the change in the airspeed in the identified typical trajectory.

3. The method according to claim 2, wherein the calculation of the approach trajectory is repeated iteratively in given sequences, based on a typical trajectory, as identified at an initial position of the rotorcraft located upstream of the final approach fix, taking into consideration, during each of the sequences, a position of the rotorcraft that is treated as the current position, and correcting the approach trajectory on the basis of the typical trajectory, in accordance with a current wind model as determined at the position of the rotorcraft that is treated as a current position.

4. The method according to claim 1, wherein taking into consideration a point of departure for an approach trajectory, the point of departure being located upstream of the final approach fix and being defined through the calculation of an approach trajectory at a position of the rotorcraft that is located upstream of the final approach fix, the approach trajectory is calculated according to the following steps:

before the rotorcraft passes the point of departure, the approach trajectory is calculated from the point at the upstream end of the downstream segment to the point of departure, on the basis of the identified typical trajectory; and after the rotorcraft passes the point of departure, the position of the point of departure then being considered to have been frozen, the approach trajectory is calculated from the current position of the rotorcraft to the point at the upstream end of the downstream segment, on the basis of the identified typical trajectory.

5. The method according to claim 1, wherein the speed and direction characteristics of the wind model are determined through the application of a calculation rule, taking into consideration at least one calculation parameter relating to the characteristics of the terrain that is assumed to surround the landing point, and also taking into consideration the wind characteristics, as measured, at least by instrumentation present on board the rotorcraft.

6. The method according to claim 5, wherein by default the value of the calculation parameter is defined according to an environment surrounding the landing point that is assumed to be flat.

7. The method according to claim 5, wherein by default the value of the calculation parameter is deduced according to the characteristics of the wind, as measured on board the rotorcraft and at the landing point, respectively.

8. The method according to claim 5, wherein the characteristics of the wind model are calculated by further taking into consideration the characteristics of the wind, as measured at the landing point and transmitted to the rotorcraft from the landing point.

9. The method according to claim 5, wherein the characteristics of the wind model are calculated by further taking into consideration the characteristics of the wind, as measured at an altitude within the environment of the landing point and transmitted to the rotorcraft from the landing point.

10. The method according to claim 8, wherein the calculation rule includes a first law for the calculation of the speed in the wind model, according to which:

$$WS(h)=WS_0(h_0)*(h/h_0)^\alpha$$

in which first calculation law "WS(h)" is the wind speed at a given ground height "h" of the rotorcraft, "$WS_0(h_0)$" is the wind speed at the landing point at a ground height "$h_0$", and "$\alpha$" is the calculation parameter.

11. The method according to claim 10, wherein the wind model is determined by treating as constant a wind direction between the landing point and a position that is treated as the current position of the rotorcraft, according to the characteristics of the wind, as measured either on board the rotorcraft or at the landing point.

12. The method according to claim 10, wherein the calculation rule includes a second law for the calculation of the wind direction, according to which the wind direction is calculated by interpolation between at least two measurements of the wind characteristics taken on board the rotorcraft and at the landing point, respectively.

13. The method according to claim 1, wherein the limit slope is defined for a rotorcraft having a given structure based on a limit on a vertical speed of the rotorcraft in relation to a predefined first threshold for a change in vertical speed, on a nominal airspeed of the rotorcraft at the point at the upstream end of the downstream segment, the airspeed being determined by the identified typical trajectory, and on the headwind component for the rotorcraft, the characteristics of the headwind component being estimated by the wind model at the point at the upstream end of the downstream segment.

14. The method according to claim 13, wherein the limit slope is defined in accordance with the following calculations:

$$Lh = \text{arctg} \frac{Vzs_1}{\sqrt{Vair^2 - Vzs_1^2} - Vt}$$

in which "Lh" is the limit slope, "$Vzs_1$" is the first speed threshold, "Vair" is the airspeed of the rotorcraft, and "Vt" is the headwind component for the rotorcraft, Lh, Vzsl, Vair, and Vt being considered at the point at the upstream end of the downstream segment.

15. The method according to claim 1, wherein the downstream segment is predefined for a rotorcraft having a given structure for a given period for a given constant slope, with the stable flight being treated as forward progress of the rotorcraft, at an acceleration deemed to be nil, with a constant airspeed and with a vertical speed of the rotorcraft that is limited in terms of a predefined second threshold for a change in vertical speed.

16. The method according to claim 15, wherein the value of at least one of the first threshold and the second threshold is between 500 feet/minute and 1,500 feet/minute.

17. The method according to claim 1, wherein the operation for guiding the rotorcraft employs:

an operation comprising comparing current information provided by the instrumentation on board the rotorcraft and relating to a change in the current ground speed and a change in the current ground height of the rotorcraft against information calculated in relation to a change in the ground speed and a change in the ground height defining the approach trajectory; and an operation comprising modifying the current position of the rotorcraft by guiding the rotorcraft in accordance with the application of a change in the ground speed and a change in the ground height defining the approach trajectory.

18. The method according to claim 17, wherein when the guidance of the rotorcraft is implemented by a human pilot who issues manual flight commands, the comparison operation is performed by a display.

19. The method according to claim 17, wherein when the guidance of the rotorcraft is implemented by an autopilot, the comparison operation is performed by a calculation, with the calculation results being used by the autopilot to generate automated flight commands.

20. A system for the calculation of an approach trajectory that is suitable for the implementation of a guidance method for a rotorcraft in accordance with claim 1, wherein the calculation system includes:

a first communications interface between computers and an aeronautical database and a supplemental database;

a second communications interface between the computers and a display;

a third communications interface between the computers and the instrumentation on board the rotorcraft, the third communications interface including at least one device for the detection of the forward speed of the rotorcraft, associated with a wind characteristics detector configured to determine characteristics of the wind surrounding the rotorcraft, a satellite navigation system, and a rotorcraft mass assessor; and a fourth communications interface between the computers and a data transmitter;

with the computers including:

a) a first computer for determining the wind model according to information transmitted at least by the third communications interface;

b) for a given landing point and in accordance with instructions from ground personnel transmitted via the data transmitter, a pilot selector for an approach route from among the approach routes stored in the aeronautical database;

c) a second computer for selecting a typical trajectory from among the typical trajectories stored in the supplemental database, based on the information transmitted by the first communications interface and by the third communications interface, and according to the wind model previously determined by the first computer; and d) a third computer for defining the approach trajectory in accordance with the selected typical trajectory and in accordance with the information transmitted by the third communications interface.

21. A rotorcraft equipped with a computer system according to claim 20.

* * * * *